US008331958B2

(12) United States Patent
Hein et al.

(10) Patent No.: US 8,331,958 B2
(45) Date of Patent: Dec. 11, 2012

(54) AUTOMATICALLY IDENTIFYING LOCATION INFORMATION IN TEXT DATA

(75) Inventors: Daniel D. Hein, Olathe, KS (US); Nathan J. Bishop, Olathe, KS (US); Jason B. Yonker, Lee's Summit, MO (US)

(73) Assignee: Garmin Switzerland GmbH (CH)

( * ) Notice: Subject to any disclaimer, the term of this patent is extended or adjusted under 35 U.S.C. 154(b) by 662 days.

(21) Appl. No.: 12/212,413

(22) Filed: Sep. 17, 2008

(65) Prior Publication Data

US 2009/0156229 A1 Jun. 18, 2009

Related U.S. Application Data

(60) Provisional application No. 61/013,587, filed on Dec. 13, 2007.

(51) Int. Cl.
*H04W 24/00* (2009.01)

(52) U.S. Cl. .............. 455/456.3; 455/456.1; 455/456.2; 455/456.5; 455/456.6; 455/457

(58) Field of Classification Search .............. 455/414.1, 455/414.2, 414.3, 414.4, 418, 466, 566, 419, 455/457, 456.1–456.6
See application file for complete search history.

(56) References Cited

U.S. PATENT DOCUMENTS

| | | | | |
|---|---|---|---|---|
| 5,519,760 A * | 5/1996 | Borkowski et al. | ........ | 455/404.2 |
| 5,946,615 A * | 8/1999 | Holmes et al. | .............. | 455/412.1 |
| 6,081,803 A * | 6/2000 | Ashby et al. | ........................... | 1/1 |
| 6,249,742 B1 * | 6/2001 | Friederich et al. | ............ | 701/202 |
| 6,405,123 B1 * | 6/2002 | Rennard et al. | ............... | 701/200 |
| 6,456,929 B1 | 9/2002 | Ohshima | ........................ | 701/207 |
| 6,563,459 B2 * | 5/2003 | Takenaga | .................. | 342/357.31 |
| 6,600,919 B1 * | 7/2003 | Kawase | ..................... | 455/414.1 |
| 6,985,562 B1 * | 1/2006 | Matsuda et al. | ........... | 379/88.06 |
| 7,085,629 B1 * | 8/2006 | Gotou et al. | ........................ | 701/1 |
| 7,263,551 B2 | 8/2007 | Belfiore et al. | ............... | 709/219 |
| 7,340,389 B2 * | 3/2008 | Vargas | ............................... | 704/8 |
| 7,376,636 B1 * | 5/2008 | Wang et al. | ................... | 707/694 |
| 7,469,182 B2 * | 12/2008 | Huang et al. | ................... | 701/400 |
| 7,623,860 B2 * | 11/2009 | Hurst | ......................... | 455/432.1 |
| 2004/0102201 A1 * | 5/2004 | Levin | ............................. | 455/466 |
| 2005/0261823 A1 * | 11/2005 | Huang et al. | ................... | 701/200 |
| 2007/0112777 A1 | 5/2007 | Field et al. | ...................... | 707/10 |
| 2008/0233981 A1 * | 9/2008 | Ismail | ............................ | 455/466 |

FOREIGN PATENT DOCUMENTS

| | | |
|---|---|---|
| JP | 2002-228477 | 8/2002 |
| JP | 2003-177027 | 6/2003 |
| KR | 10-2006-0032841 | 4/2006 |
| KR | 10-2007-0099947 | 10/2007 |
| WO | WO 2006135255 A1 * | 12/2006 |

OTHER PUBLICATIONS

Firefox Add-ons, Mini Map Sidebar 0.1.4.11, printed Nov. 27, 2007.
JGUI: GPS W.A.I.T.—We are in Touch, published prior to Dec. 13, 2007.
Garmin PeerPoint Messaging System, May 23, 2007.
Pouliquen, Bruno et al.; Geocoding Multilingual Texts: Recognition, Disambiguation and Visualization, 2006.
Linspire Internet Suite, Search, shop and spellcheck in a flash with Hot Words, printed Nov. 27, 2007.

* cited by examiner

*Primary Examiner* — Olumide T Ajibade Akonai

(74) *Attorney, Agent, or Firm* — Samuel M. Korte; Mohammad M. Ali

(57) ABSTRACT

Techniques are described for automatically identifying/recognizing location information in received data and then providing navigational-related functions associated with the location information. In one or more implementations, automatically identifying location information may be performed using a locale context. More particularly, the locale context may serve as a basis for determining how text data is parsed and which expressions are used to parse text in order to recognize the location information.

22 Claims, 4 Drawing Sheets

AUTOMATICALLY IDENTIFYING LOCATION INFORMATION IN TEXT DATA

RELATED APPLICATION

This Application, under the provisions of 35 U.SC. §119 (e), claims the benefit of and priority to U.S. Provisional Application Ser. No. 61/013,587, filed Dec. 13, 2007 and entitled "Method and Apparatus for Using Locale Context to Automatically Identify Street Addresses within Free-Form Text", the disclosure of which is incorporated herein by reference in its entirety.

BACKGROUND

Because of their relatively small size and form, mobile electronic devices such as cellular phones, personal digital assistants (PDAs), personal navigation devices (PNDs) and the like offer several practical advantages with respect to providing navigational-related assistance to a user. One reason for this is that because of their small form and portability, these devices are capable of providing real-time navigational instructions to users in a convenient fashion while they are routing to a destination. The small form of these devices, however, may also impose certain practical limitations with respect to users interacting with these devices. For instance, entering and reviewing text and other types of information on these devices when searching for, viewing and/or otherwise obtaining location information may be cumbersome and tedious.

SUMMARY

Techniques are described for automatically identifying/recognizing location information in received data and providing navigational-related functions associated with the location information. In one or more implementations, location information for a location(s), such as address information for instance, is automatically identified/recognized in text data using described textual location extraction techniques, regardless of the text's structure or format, lack of structure or format and/or source. As such, no special formatting or keywords in the text data is necessary. At least a portion of this text data may be unstructured free-form text and/or structured/formatted text received in content such as a web page, short message service (SMS) message, multimedia message service (MMS) message, electronic-mail (e-mail) message, instant messaging (IM) message or other type of content. Additionally or alternatively, this data may be received as content other than text, such as an audio file(s), video file(s), image file(s) or media metadata file(s) for instance, and then transformed into text. Once the location information is identified, it may be geo-coded into one or more coordinates for the location. However, in at least some implementations, the location information is first tokenized into one or more tokens in order to facilitate geo-coding. Based on the geo-coded location information, one or more navigational-related functions for the location may then be provided to a user.

In at least some implementations, automatically identifying, tokenizing and/or geo-coding may be performed using a locale context. More particularly, the locale context may serve as a basis for determining how the text data is parsed and which expressions are used to parse the text in order to recognize the location information, break the location information down into one or more location information blocks and then tokenize (if necessary) and/or geo-code it.

This Summary is provided solely to introduce subject matter that is fully described in the Detailed Description and Drawings. Accordingly, the Summary should not be considered to describe essential features nor be used to determine the scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Example Environment

Figure 1:
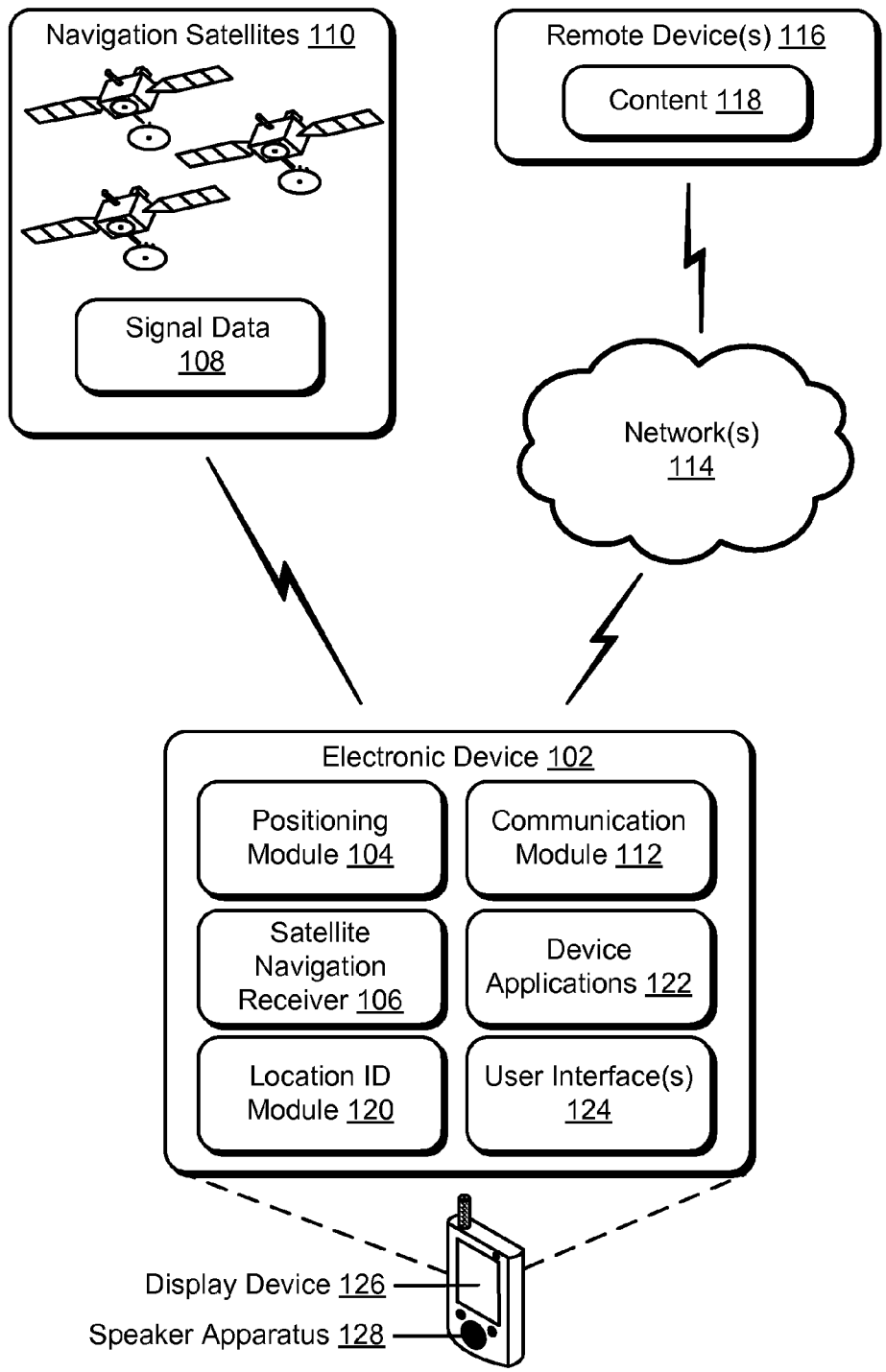
FIG. 1 depicts an example environment in which textual location extraction techniques for automatically identifying/recognizing location information in received data and providing navigational-related functions associated with the location information may be implemented.

FIG. 1 depicts an example environment 100 in which techniques for automatically identifying/recognizing location information in received data and providing navigational-related functions associated with the location information may be employed. In this example, environment 100 includes electronic device 102 which is configured to provide a variety of functionality through various application modules and operations. Electronic device 102 may be configured as any suitable type of device or devices such as, without limitation, a cellular and/or voice over IP (VOIP) phone, smart phone, position-determining device, personal navigation device (PND), personal digital assistant (PDA) and/or other handheld computing device, multimedia device, game device or any combination thereof. In at least some implementations, electronic device 102 is a portable cellular phone device configured with position-determining functionality and wireless communication functionality. In the following description a referenced component, such as electronic device 102, may refer to one or more entities, and therefore by convention reference may be made to a single entity (e.g., electronic device 102) or multiple entities (e.g., electronic devices 102—the plurality of electronic devices 102) using the same reference number.

In this example, electronic device 102 includes a positioning module 104 which is representative of position-determining functionality associated with managing and processing signal data to determine a position/location for electronic device 102 and, potentially, to provide one or more navigational-related functions to a user. As such, in this example electronic device 102 is a location-aware device. More particularly, electronic device 102 is depicted here as including a satellite navigation receiver 106 associated with functionality to receive signal data 108 from navigation satellites 110. Satellite navigation receiver 106 may be configured in a variety of ways such as a global positioning system (GPS)

receiver, a global navigation satellite system (GLONASS) receiver, a Galileo receiver, or other satellite navigation receiver. While for the sake of discussion, positioning module 104 and satellite navigation receiver 106 are illustrated and described herein separately, this is not to be construed to mean that they are necessarily exclusive from one another. For example, in at least some embodiments, positioning module 104 may include satellite navigation receiver 106.

Received signal data 108 may be managed and processed by positioning module 104 to determine/calculate a current position or location of electronic device 102 in the context of map data associated with and describing a geographical region that includes the electronic device's current location and/or one or more other locations. Various navigational-related functions associated with the current location and/or other location(s) may then be provided to a user. Navigational-related functions may include any type of function(s) associated with a location(s) and/or information associated with a location(s). By way of example and not limitation, this may include displaying location information, presenting location information for selection (e.g., via an icon or other indicia), storing location information, linking to location information, saving a location as a point of interest (POI), displaying a current location and/or another location(s) in the context of the map data and/or navigational-related instructions (e.g., real-time turn-by-turn instructions) for navigating/routing to a destination location from a current location.

Electronic device 102 also includes a communication module 112 which is representative of communication functionality to permit electronic device 102 to send/receive data locally between different devices (e.g., components/peripherals) and/or remotely over one or more networks 114. Sending/receiving data over one or more networks 114 may include, without limitation, sending/receiving data through wired and/or wireless means over one or more cellular networks and/or over one or more internet protocol (IP)-based data networks. As such, electronic device 102, through communication functionality represented by communication module 112, may be configured to communicate via one or more networks 114 with one or more remote devices 116 to send, receive or otherwise interact with content 118. Content 118 may include, among other things, location-related message data that includes location information that can be automatically identified or recognized. This location-related data may be unstructured text, structured text and/or other data convertible to text (e.g., audio, video or image media) sent/received via one or both of a cellular network or an IP-based network as an e-mail, e-mail attachment, IM, SMS/MMS message or other content.

Communication module 112 is representative of a variety of suitable communication components and functionality. By way of example and not limitation, this may include antennas, browsers, transmitters and/or receivers, radios, data ports, software interfaces and drivers, networking interfaces, data processing components and the like. One or more networks 114, in turn, is representative of a variety of suitable networks and network connections that may be employed individually or in combination to communicate among the various components of environment 100. Thus, one or more networks 114 is representative of communication pathways achieved using a single network or multiple networks which, without limitation, may include the internet, a local area network(s) (LAN), a wide area network(s) (WAN), a cellular voice and/or data network(s) or the like; and be accessible via any combination of wired, backhaul and/or wireless network communication pathways.

In accordance with the techniques described herein, electronic device 102 may also include a location identification (ID) module 120 configured for processing location related data included with content 118. More particularly, this processing may include performing the following functions: transforming the data into text (if necessary), automatically identifying or recognizing location information in the data, tokenizing the location information (if necessary) and/or geocoding the location information into one or more coordinates designating a location or locations. In at least some implementations, the described processing functions may be performed on electronic device 102. Additionally or alternatively, at least a portion of these processing functions may be performed by one or more remote devices communicatively linked to/with electronic device 102 via one or more networks 114 and/or other suitable means.

To provide functions such as the described position-determining functions, navigational-related instructions, communication functions and data processing functions, electronic device 102 may include a variety of device applications/programs, designated here as device applications 122. For example, positioning module 104 may be associated with program(s) related to determining/calculating the current position/location of electronic device 102. As another example, location ID module 120 may be associated with program(s) related to processing received location-related data to provide, based at least in part on the current location and the location-related data, certain navigational-related functions. Additionally, device applications 122 may operate to form one or more corresponding user interfaces 124 that may be visually output via display device 126 and/or audibly output via speaker apparatus 128 to facilitate a user in interacting with electronic device 102.

Figure 2:
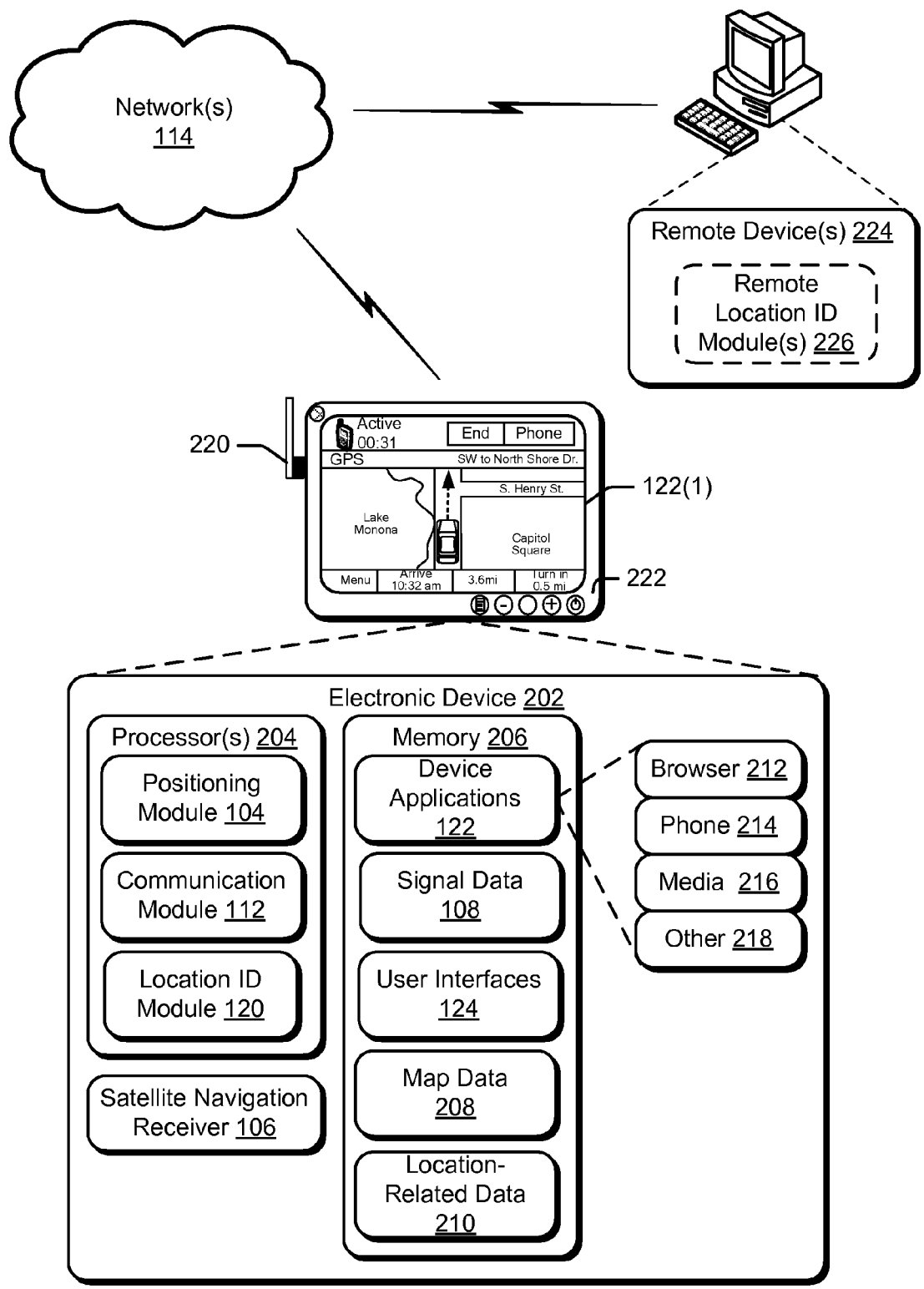
FIG. 2 depicts an example implementation of the electronic device shown in the environment of FIG. 1.

FIG. 2 depicts an example implementation of electronic device 102 shown in environment 100 of FIG. 1. In this example, electronic device 202 includes one or more respective processors 204 and memory 206 which may be utilized to provide a variety of processing and storage capabilities. One or more processors 204 are not limited by the materials from which they are formed or the processing mechanisms employed therein, and as such, may be implemented via semiconductor(s) and/or transistors (e.g., electronic integrated circuits (ICs)) and so forth. Additionally, although a single memory 206 is shown for electronic device 202, a wide variety of types and combinations of memory may be employed, such as random access memory (RAM), removable medium memory (e.g., memory 206 may be implemented via a slot that accepts a removable memory card or cartridge), hard disk memory and/or other types of computer-readable media.

In this example, positioning module 104, communication module 112 and location ID module 120 are illustrated as being executable via one or more processors 204 and are storable in memory 206. In this regard, any or all of these modules may be executable by the same processor(s) of one or more processors 204, different processor(s) of one or more processors 204 or any combination thereof. Additionally, memory 206 is illustrated as storing various device applications 122, signal data 108, user interfaces 124, map data 208 and location-related data 210. Location-related data 210 may have been obtained remotely from, and then received on, electronic device 202. Additionally, location-related data 210 may form portions of content 118 and may include, without limitation, unstructured text, structured text and/or other data convertible to text (e.g., audio, video or image media, etc.). Here, it is worth noting that data stored in memory 206 may be locally maintained by electronic device 202 in various suitable forms, and be received via a variety of suitable means.

Furthermore, user interfaces 124 may be formed and output via any suitable applications, including via one or more of device applications 122 for instance.

Additional device applications 122 are illustrated as including browser application 212, phone application 214 and media application 216. In this regard, browser application 212 may represent functionality executable on one or more processors 204 to receive or otherwise interact with content 118 from one or more remote devices 116 of FIG. 1, such as to receive at least a portion of signal data 108 (when appropriate), map data 208, location-related data 210, e-mail services, instant messaging services, view web pages and/or other content. Phone application 214 may represent functionality executable on one or more processors 204 to obtain phone service from a cellular and/or VOIP provider, such as to make and receive mobile phone calls, manage contacts, send/receive text messages, and in some implementations even receive all or part of map data 208, location-related data 210 and/or signal data 108 (if/when appropriate). Media application 216 may represent functionality executable on one or more processors 204 to manage a media library that may include music files, images, videos, media metadata and the like. A variety of other applications 218 may also be included to provide additional functionality to electronic device 202 as well.

For the purposes of this discussion, electronic device 202 may relate to a variety of different navigation techniques and other techniques that may be supported by "knowing" or "being aware of" one or more positions/locations—including its current location. For instance, position-determining functionality may be employed to provide location information, timing information, speed information, direction of movement and a variety of other navigation-related data. Accordingly, electronic device 202 may be configured in a variety of ways to perform a wide variety of functions. For example, electronic device 202 may be configured for outdoor navigation, vehicle navigation, aerial navigation (e.g., for airplanes, helicopters), marine navigation and so forth. Accordingly, electronic device 202 may include a variety of devices to determine position(s) and provide navigational-related functions using one or more of the described techniques. In this regard, positioning module 104 may be executed to use received signal data 108 and/or location-related data 210 in combination with map data 208 to provide various navigational-related functions such as, without limitation, saving a location as a POI, displaying the current location and/or another location in the context of map data and/or providing real-time instructions for routing or traveling to a location. To receive signal data 108 and/or location-related data 210, as well as to perform other communications, electronic device 202 may include one or more antennas 220. Positioning module 104 may also be executed to provide other position-determining functionality, such as to determine a current speed, direction, calculate an arrival time and so on.

With respect to receiving user input, device 202 may be configured to receive input, thus allowing a user interact with the various functions of position-determining electronic device 202. For example, electronic device 202 may be configured with a touch-screen that is responsive to direct touch. Accordingly, user interfaces 122(1) may be configured to define selectable areas of the touch-screen to perform one or more of these various functions. Alternatively or additionally, various input controls 222 such as buttons, dials, microphones and the like may be provided to receive user input.

As noted above, location-related data 210 may be received from one or more remote devices via one or more networks 114. This allows location-related data to be obtained (by searching, viewing or otherwise interacting with a data source(s)) on, and/or sent by, one or more devices remote from electronic device 202, such as a mobile electronic device or desktop computer for instance. The remotely obtained location-related data 210 may then be received on electronic device 202 for processing, which may include but is not limited to: transforming, automatically identifying location information, tokenizing and geo-coding. Additionally or alternatively, at least a portion of this processing may be performed on one or more devices remote from electronic device 202 before electronic device 202 provides the one or more navigational-related functions. For example, location-related data may be received on one or more remote devices 224 to perform at least a portion of the processing before being sent to electronic device 202.

Accordingly, one or more remote devices 224 are illustrated in FIG. 2 as being communicatively linked to electronic device 202 via one or more networks 114. In addition, one or more remote devices 224 are illustrated as including one or more optional remote location ID modules 226 which, in at least some implementation, may be configured to perform all or part of the described processing. The one or more remote devices 224 may be configured in a variety of ways such as, without limitation, being a client laptop or desktop device suitable for obtaining location-related data and/or a server device configured with a remote location ID module 226 for instance. However, the electronic device 202 may receive location-related data from any services or devices, including other mobile devices. Furthermore, any number of remote devices 224 may be communicatively linked via one or more networks 114 or other suitable means such that unprocessed and/or processed location-related data may be sent to, and/or received from, electronic device 202.

Here, it should be noted that any of the functions described herein may be implemented using software, firmware, hardware (e.g., fixed logic circuitry), manual processing, or a combination thereof. The terms "module", "function(s)" and "functionality" as used herein generally represent software, firmware, hardware or a combination thereof. In the case of a software implementation, for instance, a module represents executable instructions that perform specified tasks when executed on a processor, such as one or more processors 204 for instance. Furthermore, the program code may be stored in one or more computer-readable media, such as memory 206 for instance.

Example Procedure

Figure 3:
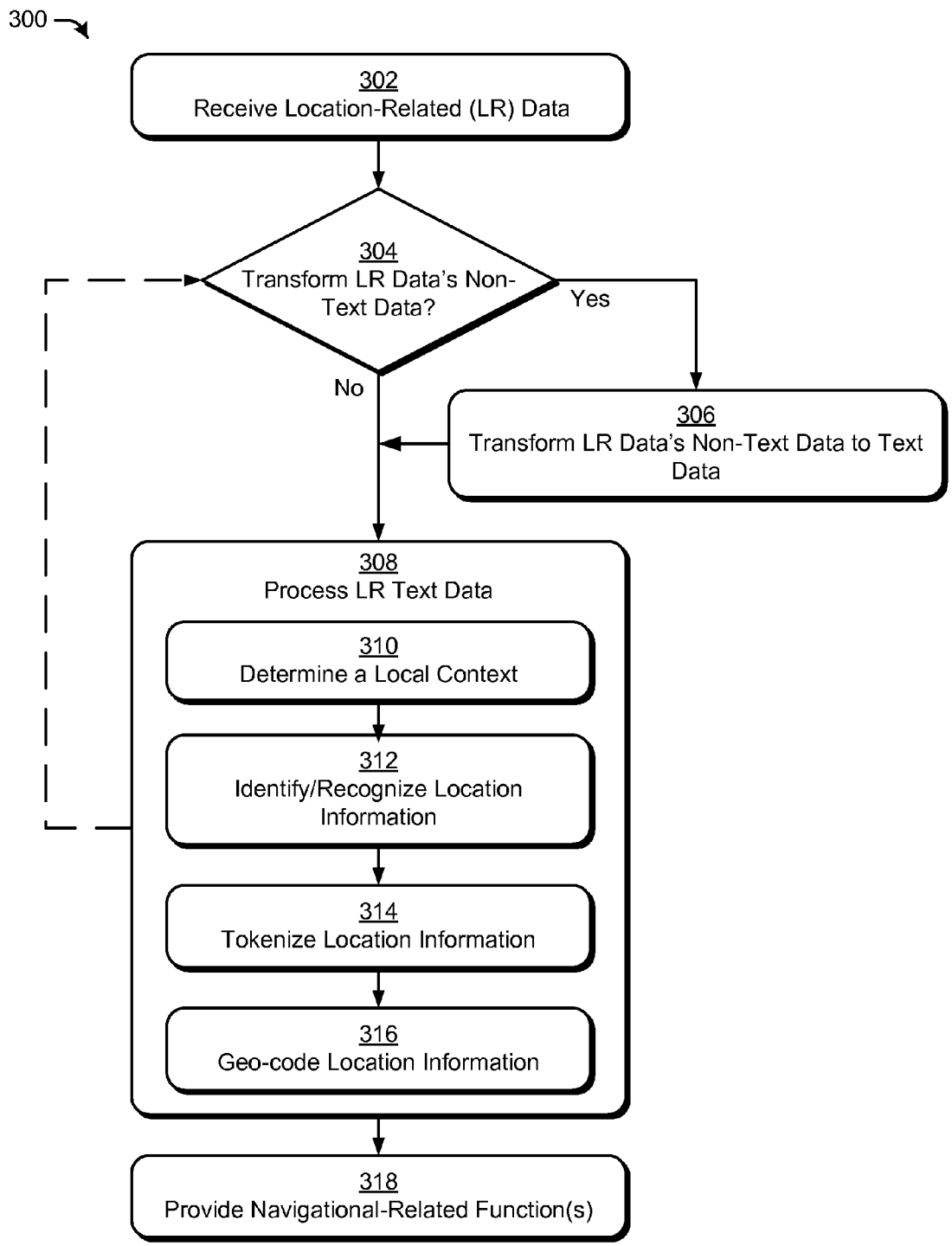
FIG. 3 depicts an example procedure in which the described textual location extraction techniques may be implemented.

FIG. 3 depicts an example procedure 300 in which the described textual location extraction techniques may be implemented. Aspects of this procedure may be implemented in hardware, firmware, software or any combination thereof. The procedure is shown as a set of blocks that specify operations performed by one or more devices but is not necessarily limited to all of the illustrated operations or the order in which these operations are depicted and described. Furthermore, for discussion purposes, reference may be made to FIGS. 1 and 2 in various portions of the following discussion. However, it is to be appreciated and understood that this is not intended to limit the spirit and scope of the claimed subject matter. As such, the features described below are platform-independent, meaning that the described techniques may be implemented on a variety of commercial computing platforms having a variety of processors.

At block 302, location-related (LR) data is received. This data may include location information for a location, such as address information for instance, and consist of unstructured text, structured text and/or other data convertible to text (e.g., audio, video or image media) that has or may be received as an e-mail message, e-mail message attachment, instant message (IM), SMS, message, MMS message, web page(s) or other suitable content 118. The LR data may be unstructured text and accordingly the location information does not have to be explicitly expressed in a particular format or structure. As such, the data may come from a plurality of different sources. Furthermore, this data may be received on a variety of devices from the plurality of different sources. For example, as described above, this data may be received on a relatively small mobile electronic device such as electronic device 202 for instance. Recall that in this regard, communication module 112 provides communication functionality permitting an electronic device 202 to receive content 118 which may include data with location information remotely over one or more networks 114. Alternatively or additionally, this data may be received by one or more additional devices communicatively linked to electronic device 202, such as remote device(s) 224 for instance.

As noted above, LR data may be obtained remotely from the device or devices that will receive and/or process it. For example, consider a user wishing to locate a business or businesses providing a particular product. The user may first search, via the Internet or other source, for LR data associated with a particular business using a device having a relatively large form, such as a laptop or desktop computing device for instance. Once the user has found the LR data on an Internet web page(s) or other suitable source(s), they may send it (as a web page(s), e-mail, e-mail attachment, IM, SMS/MMS message or other suitable content 118) to a relatively small mobile electronic device, such as electronic device 202 for instance. The user may then utilize the mobile electronic device to navigate/route to the business. This might include receiving turn-by-turn instructions, based at least in part on the LR data, while the user is navigating/routing.

As another example, LR data may be sent to the mobile electronic device from a remote mobile electronic device. In this regard, a remote user of the remote mobile device may send LR data from the remote mobile device as a web page(s), e-mail, e-mail attachment, IM, SMS/MMS message or other suitable content 118. After receiving the LR data, the mobile electronic device may then be utilized to navigate/route to the business associated with the LR data.

Alternatively or additionally, LR data may be obtained on the electronic device itself. For example, the user of the mobile electronic device may access LR data utilizing a web browser and/or other functionality on the mobile electronic device to search the Internet or other suitable source(s) for LR data associated with the POI(s). Once the user has found the LR data on an Internet web page(s) or other suitable source(s), the mobile electronic device may then be utilized to navigate/route to the business associated with the LR data.

At block 304, a determination is made whether to transform at least a portion of the LR data's non-text data to text data. This determination may be based on any suitable criteria. By way of example and not limitation, this operation may determine that any transformable non-text data is to be transformed. Alternatively, this operation may rely on other criteria to determine whether non-text data is to be transformed such as, without limitation, whether the all or part of the non-text data is likely to include location information and/or whether the LR data's text data, if any, includes sufficient/ satisfactory location information (e.g., this may be ascertained from the received data before further processing and/or from processing feedback—as illustrated by the dashed line).

Continuing, if the received data includes non-text data and, at block 304, it is determined that at least a portion of the non-text data is to be transformed (i.e., "Yes"), procedure 300 proceeds to block 306 where all or part of the transformable non-text data is transformed. A variety of techniques may be employed to transform non-text data such as, without limitation, optical character recognition (OCR) techniques. Procedure 300 then proceeds to block 308 described below. If at block 304 it is determined that received non-text data is not to be transformed (i.e., "No"), procedure 300 may skip blocks 304 and 306 and proceed directly to block 308.

At block 308, the LR text data is processed. This text data may include text data received at block 302 and/or text data transformed from non-text at block 306. As noted above, this processing may be performed on the same device or on multiple communicatively linked devices. For instance, processing may be performed on the device(s) that received the LR data. Alternatively, at least a portion of the processing may be performed on a device or devices remote from the device(s) that received the LR data. In such situations, it may be necessary for the various devices involved to communicate (send/receive) LR data back and forth to one another. By way of example and not limitation, the LR data may be received on a server device which performs the processing, such as remote device(s) 224. The LR data may then be communicated to a mobile device remote from the server device, such as electronic device 202 for instance, which provides navigational-related functions based at least in part on the processed LR data. Additionally or alternatively, the LR data may be received on the mobile device which performs the processing and provides the navigational-related functions.

Processing the LR text data at block 308 may include certain logically identifiable operations at blocks 310-316. More particularly, at block 310, a locale context (LC) is determined. An LC may be thought of as a contextual basis for determining how the LR text data is to be processed. For example, if an LC associated with Germany is determined, the LR text data may be processed using parsing techniques and expressions suitable and applicable for the German language and/or for German address characteristics. This may include accounting for particular attributes of German addresses, such as German words, letters, terms and/or punctuation marks. For instance, German addresses may be expressed using the convention that street names and residence numbers, and postal codes and towns are separated by a "+" character. As such, using the expression "+" to parse German text to identify/recognize address information is likely to be suitable, while using this expression to parse non-German text is not. As another example, the German term for "postal zip code" is "Postleitzahl" or "PLZ" for short. As such, using the expressions "Postleitzahl" and "PLZ" to parse German text is also likely to be suitable, while using these expressions to parse non-German text is not.

The LC may be determined a variety of ways. For instance, the LC may be manually determined, at least in part, by a user. This may include the user designating an LC setting on the mobile electronic device that will provide the navigational-related functions and/or on one or more other devices that will process the LR text data. Additionally or alternatively, the LC may be automatically determined, at least in part, without user participation using suitable processing technique(s) based on one or more factors or criteria. Without limitation, suitable processing techniques may include employing filtering, searching, sorting, hashing, use of statistical models and/ or imperative functions implemented in software, hardware, firmware or any combination thereof. By way of example, in at least some implementations one or more filters and/or decision functions are utilized to automatically determine the LC based on the one or more factors or criteria. This filter(s) and/or decision function(s) may employ various suitable techniques (e.g., N-Gram-based text categorization, specialized data extraction, etc.) to accomplish this. Furthermore, certain techniques and/or factors may be prioritized with respect their importance/influence. Without limitation, these factors/criteria may be associated with the location and/or other status of the mobile electronic device, content and/or characteristics of the LR text data (e.g., the text's language, terms or expressions in the text and/or non-text data, etc.), content and/or characteristics of data other than the LR text data received (wirelessly or otherwise) on the device (e.g., uniform resource locator (URL) content, IP address information of a wireless-fidelity (WI-FI) hotspot within transmission range, information from a cellular tower within transmission range, etc.) and/or one or more settings (e.g., a default setting and/or user-designated LR setting) of the mobile electronic device and/or the other devices.

As a practical example, consider a user of electronic device 202 from the United States (U.S.) who is traveling in Germany. In at least some embodiments, the user may manually determine that a German LC rather than a U.S. LC is to be used to process received LR data by designating a German LC setting on the device. In at least some other embodiments however, electronic device 202 (and/or remote device(s) 224) may automatically determine that a German LC is to be used based on one or more factors/criteria such as those mentioned above. For instance, electronic device 202 may know that it is located in Germany by determining its own location using the positioning module 104. Furthermore, electronic device 202 may have also ascertained that received LR data is expressed in the German language. Electronic device 202 may then employ a filter(s) and/or decision function(s) (either of which may include certain heuristic rules) to automatically determine that the German LC is to be used. Furthermore, if electronic device 202 is not aware of its current location, the decision function or other logic may then fall back to consider other factors such as relying on a default LC setting and/or considering URL information, IP address information or the like. Additionally or alternatively, electronic device 202 might even prompt the user to manually make or help to make the determination.

Finally, it is to be appreciated and understood that that while for the sake of simplicity and clarity block 310 is described in the context of determining a single LC, any number of LCs may be determined at block 310 without departing from the spirit and scope of the claimed subject matter. As such, a plurality of LCs, when combined, may also be thought of as a contextual basis for determining how LR text data is to be processed.

Continuing, at block 312, location information in the LR text data is identified or recognized. This may be performed automatically using the LC(s) and any suitable processing technique(s). As such, in at least some implementations, no user participation is necessary to perform this operation. Without limitation, suitable processing techniques may include employing filtering, searching, sorting, hashing, use of statistical models and/or imperative functions implemented in software, hardware, firmware or any combination thereof. For example, in at least some implementations, one or more filters utilize one or more classification expressions suitable for the LC(s) to identify/recognize location information by parsing the LR text data (utilizing a suitable parsing technique such as bitmap hashing or the like) and classifying/categorizing it into one or more discrete portions or location blocks. More particularly, in at least some implementations, the LR text data is scanned to identify characters and/or words relevant to the LC(s). These identified relevant characters and/or words may be considered candidates in that they may be indicative of location information, such as address information. As such, the identified relevant characters and/or words (and characters and/or words proximate to the relevant characters and/or words) may then be assessed (e.g., hashed and tested) to recognize location information, if present, by attempting to fit patterns in the identified relevant characters and/or words (and proximate characters and/or words) determined by the LC(s) to the locate the beginning and end of discrete location blocks, such as discrete address blocks for instance. In other words, the relevant characters and/or words, and characters (and proximate characters and/or words) are tested to determine whether they belong to a set of expressions indicative of location information. In at least some embodiments, this is accomplished at least in part by utilizing one or more bloom filters. In the context of the example above where the user is traveling in Germany and electronic device 202 is utilizing a German LC, classification expressions suitable for the German language and for German address formatting may be utilized to identify/recognize the location information. The above-described terms "+", "Postleitzahl" and "PLZ" are examples of such suitable classification expressions.

In practice, one or more postal filters may be used to identify/recognize discrete address portions, referred to as address blocks, which may form all or part of an address designating a particular location. For instance, address blocks designating a street, city, zip code, country etc. or any combination thereof may be identified. As an example, again consider the example above where the user is traveling in Germany. Assume the user is walking through the streets of Munich looking for SPATEN-FRANZISKANER-BRÄU (SPATEN), a brewery in Munich where the user is to meet up with a friend, but is lost and unable to find the brewery on their own. The user's friend, using another mobile electronic device, may send (via e-mail, an IM message or the like) the following message consisting of German text associated with the brewery's location to the user's e-mail address, IM profile or the like:

Spaten-Franziskaner-Bräu GmbH
Marsstr. 46+48, 80335 München, Germany
089 5200-0
Link: <http:// maps.google.com/maps?f=l&hl=en& geocode=&q=Spaten-Franziskaner-Br% C3%A4u&near=Marsstrasse+46%2B48,+D-80335+Munich,+Germany& sll=37.0625,−95.677068&sspn= 94.000276,108. 808594&ie=UTF8&z=16&iwloc=A>

Now assume that the user utilizes electronic device 202 to receive and access the message (and thus text). Using the German LC and suitable processing technique(s), electronic device 202 may identify/recognize location address blocks (location information) in the text such as a business name ("SPATEN-FRANZISKANER-BRÄU"), Street name ("Marsstrasse"), street number ("46+48"), postal code ("80335"), Town ("Munich"), etc.

At block 314, the location information is tokenized. Tokenizing may be thought of as taking the words or lexemes in individual discrete portions or location blocks and classifying them into their respective structural elements (address tokens). For example, the following structural elements compose a United States address: "<House Number> <Street> <City> <State> <Zip>". As such, given the address 16318 S. Parkwood St., Olathe, Kans. 66062, the tokenization algorithms would make the following structural bindings:

<House Number>=16318
<Street>=S. Parkwood St.
<City>Olathe
<State>KS
<Zip>=66062

This may be performed automatically using a suitable processing technique(s). Furthermore, in at least some embodiments, the LC(s) (or a modified version of the LC(s)) described above may be used to provide a contextual basis for the tokenizing. Additionally or alternatively, one or more new LCs may be determined and used. Tokenizing the location information may be performed to facilitate the geo-coding operation described below at block 316. More particularly, certain types of geo-coding engines may use the tokenized location information and/or may perform more efficiently, accurately and/or expeditiously when the location information is tokenized.

At block 316, the location information is geo-coded. Geo-coding may be accomplished by assigning one or more geographical identifiers or coordinates, such as a latitude and longitude for example, to data. More particularly, with respect to the location information, the individual address tokens (or individual location blocks if the tokenizing operation at block 314 is not performed) are effectively converted into one or more geographical identifiers or coordinates. This allows the location information to be provided (e.g., displayed or otherwise made available) in the context of, and with respect to, available map data. For example, a particular coordinate, as expressed by a latitudinal value and longitudinal value, may be integrated with corresponding map data such that its location may be provided in the context surrounding geographical features (e.g., roads, mountains, water features, businesses, residences etc.). Furthermore, additional information associated with the location and/or the surrounding features may also be provided such as, without limitation, current weather conditions, road construction/delays, business details (e.g., name, location, contact information, hours of operation and types of goods and/or services they provide) and/or residence details (e.g., name, location, contact information, etc.).

Geo-coding may be performed automatically using a variety of suitable geo-coding engines and/or processes. For instance, in at least some embodiments a geo-coding engine employing boolean logic (requiring exact matches) and/or fuzzy logic (allowing approximate matches) may be employed. Furthermore, in at least some embodiments, the LC(s) (or a modified version of the LC(s)) described above may be used to provide a context for the geo-coding. Additionally or alternatively, one or more new LCs may be determined and used.

As a practical example, again consider the user traveling in Germany. Recall that at block 312, the above German text was received and identified/recognized certain address blocks in the text. Accordingly, after tokenizing the address blocks into address tokens (if necessary), the address tokens (or address blocks if they are not tokenized) may be geo-coded into geographical coordinates designating the location of SPATEN's location in Munich (i.e., Latitude: 48.145021 N/Longitude: 11.553524 E). As such, electronic device 202 may provide SPATEN's location in the context of, and with respect to, available map data associated with Munich.

At block 318, one or more navigational-related functions are provided. More particularly, various functions useful for navigating/routing to the location may be provided by the mobile electronic device to the user based on the geo-coded LR data determined at block 316. Without limitation, this may include allowing the user to save the location as a POI, displaying the location and/or the device's current location in the context of map data and/or providing instructions (e.g., real-time turn-by-turn instructions) for navigating/routing to the location remote from the device's current location. In the context of the example above where the user is lost in Munich, electronic device 202 may provide the user with turn-by-turn instructions, based on the geo-coded geographical coordinates, for navigating/routing to the SPATEN brewery.

Example Implementation

Figure 4:
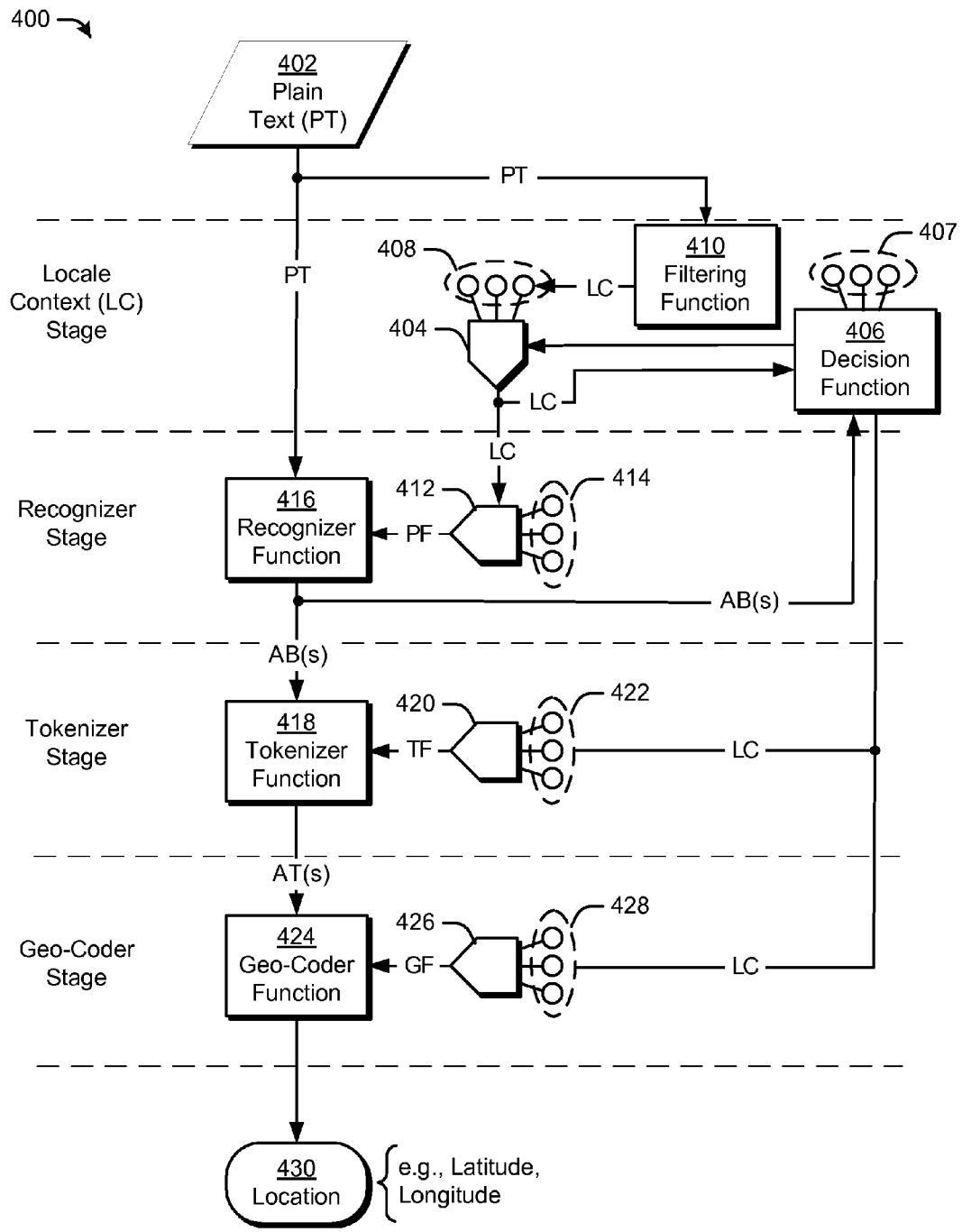
FIG. 4 depicts an example implementation of a logical model in which the described textual location extraction techniques may be implemented.

FIG. 4 depicts an example implementation of a logical model 400 in which the described textual location information extraction techniques may be implemented. Aspects of this logical model may be implemented in hardware, firmware, software or any combination thereof. While this model is described in the context of four conceptual stages, it is to be appreciated and understood that this is not limiting and other models may include any suitable type and number of conceptual stages without deviating from the spirit and scope of the claimed subject matter. For example, features and operations associated with a particular stage may be added or removed or combined with those of another stage. Furthermore, for discussion purposes, reference may be made to FIGS. 1-3 in various portions of the following discussion. However, it is to be appreciated and understood that this is not intended to limit the spirit and scope of the claimed subject matter. As such, the features described below are platform-independent, meaning that the described techniques may be implemented on a variety of commercial computing platforms having a variety of processors.

For the purposes of discussion, model 400 may be conceptualized and described as including certain logical stages. More particularly, model 400 includes a locale context (LC) stage, a recognizer stage, a tokenizer stage and a geo-coder stage. Each of these stages will be described with respect to received plain text (PT) 402. With respect to the LC stage, one or more LCs are determined at this stage using output from multiplexer (MUX) 404. MUX 404 represents one or more determined LCs to be passed on to the recognizer stage. In at least some implementations, such as the one illustrated and described here, MUX 404 is ultimately under the control of a decision function 406. Decision function 406 may receive system state information input 407 associated with the electronic device's system status. Decision function 406 may then use the information to determine one or more LCs and/or to otherwise influence which LCs are passed on to the recognizer stage by MUX 404. For example, with respect to the factors/criteria described above, system state information associated with the electronic device's location, wireless network connectivity (e.g., the presence of one or more Wi-Fi access points and/or cellular transmission towers within range, etc.) and/or system settings (e.g. a user's manual LC determination, default LC settings, etc.) may be received by decision function 406. As shown in FIG. 4, decision function 406 may also receive one or more discrete address blocks (AB(s)) from a filter or other functionality in the next stage (recognizer stage) and use this information in determining an LC(s). As such, it is possible for decision function 406 to determine an LC and/or otherwise influence the determination of an LC based at least in part on one or more received ABs.

MUX 404 may also receive input from one or more additional input sources as well. In at least some embodiments, this may be at the direction of decision function 406. Consider for example that decision function 406 may determine that the electronic device has changed location and that additional information may be available and relevant to determining an appropriate LC. As such, decision function 406 may cause MUX 404 to obtain additional information from more or more particular sources. Here, additional information is designated as input 408 and is depicted as providing information to MUX 404. Input 408 may include any type of information such as, without limitation, information associated with PT 402. In at least some implementations, input 408 may include information obtained from a filtering function, illustrated here as filtering function 410. Filtering function 410, in turn, may use any suitable filtering technique(s), such as N-Gram categorization and/or bitmap hashing for instance, to determine one or more LCs using PT 402. For example, filtering function might compare individual characters and/or other expressions (e.g., words or phrases) of PT 402 to pre-defined bitmap hashes and/or other types of representations associated with various LCs (e.g. LCs for various languages) to determine one or more LCs based on the number of matches. As a simple example, if bitmap hashes or other types of representations associated with the German language (e.g., hashed bitmaps associated with German terms, umlauted vowels such as ä, ö, and ü, URL domain extensions such as ".de", etc.) predominantly match expressions of PT 402, filtering function 410 may determine that a German LC is appropriate.

Continuing, in the recognizer stage MUX 412 receives an LC passed on by MUX 404. MUX 412 then selects (and potentially modifies) a postal address filter (PF) from various potential available filters 414 based at least in part on the received LC. Potential available filters 414 may consist of various filters distinguishable from one another by their respective classification expressions and/or parsing techniques. As such, MUX 412 may be configured to select a PF that is appropriate for the LC. As an example, a potential filter having classification expressions suitable for the German language and address format would likely be suitable for a German LC, while a filter having classification expressions suitable for another language and address format may not be. Once an appropriate PF is selected, it is passed on to recognizer function 416 which also receives the PT. Using the PF, recognizer function 416 identifies/recognizes discrete blocks of address location information in the PT by parsing the PT utilizing a suitable parsing technique such as, without limitation, filtering, searching, sorting, hashing and/or use of statistical models and/or imperative functions. Furthermore, recognizer function 416 may then classify/categorize this location information into one or more ABs. As an example, consider the example in the above discussion of block 312 of FIG. 3 where text associated with SPATEN's location is processed by electronic device 202 to identify/recognize discrete address blocks associated with this location. Finally, note that in addition to being passed on for use in the next stage (tokenizer stage), the AB(s) and/or information associated with the AB(s) (or lack thereof) may also be passed back to decision function 406. As such, a feedback loop may be established and used to influence which LC is next selected by decision function 406 and used in one or more of the stages.

Consider for instance, a situation where ABs are not available to be passed on to the tokenizer stage. Information indicative of this may be passed back, via the feedback loop, to decision function 406. Decision function 406 may then cause one or more new filtering functions to be utilized in addition to, or instead of, filtering function 410 to determine a new LC. The use of a new LC(s) may increase the likelihood of identifying useable ABs. Note that this iterative process is valuable both when too few ABs (none) are found, and when too many (likely erroneous) ABs are found.

In the tokenizer stage, tokenizer function 418 receives the AB(s) identified/recognized by recognizer function 416. In addition, tokenizer function 418 also receives a token filter (TF) selected by MUX 420. More specifically, in at least some implementations, MUX 420 receives an LC selected by decision function 406. MUX 420 then selects an appropriate token filter (TF) from potential token filters 422 (and potentially modifies the TF) based at least in part on the received LC. Potential token filters 422 may consist of various filters distinguishable from one another by their respective tokenizing expressions and/or parsing techniques. Using the TF, tokenizer function 418 then tokenizes the AB(s) into one or more address tokens AT(s) to pass on to the next stage (geo-coder stage).

In the geo-coder stage, geo-coder function 424 receives the AT(s) tokenized by tokenizer function 418. In addition, geo-coder function 424 also receives a geo-code filter (GF) selected by MUX 426. More specifically, in at least some implementations, MUX 426 receives an LC selected by decision function 406. MUX 426 then selects the GF from potential geo-code filters 428 (and potentially modifies the GF) based at least in part on the received LC. Using the GF, geo-coder function 424 then geo-codes the AT(s) into a location 430 (e.g., a coordinate defined by a latitude and longitude). As described above, the electronic device may then provide navigational instructions to a user based at least in part on location 430.

Extension—Formatted Text

Recall from above that location information can be identified/recognized in received text data regardless of text's lack of structure or format. While this permits increased flexibility and interoperability, in at least some implementations, receiving text data in a predefined message structure or format may expedite and/or simplify processing the data (e.g., identifying/recognizing location information) at least for the reason that certain filtering/processing steps may be bypassed, thus increasing processor utilization and/or conserving battery life. By way of example and not limitation, an example SMS/MMS message format that may be implemented utilizing the described techniques is provided below along with two example messages structured to conform to this example format:

Example SMS/MMS Message Format:

Message Elements

<PeerPoint>—Main tag for sending a Garmin PeerPoint

<GarminLoc>—Main tag for sending a non-PeerPoint location

Human-readable lat/lon: <N XX.XXXXX W XXX.XXXXX>

For PeerPoints, try to fit the nearest available address into the message.

For POI locations, use <N> for the POI name, use <A> for the optional POI address, and use <T> for the optional POI telephone number The message information that doesn't need to be human-readable should be packed/compressed and contained at the end of the message with a <GRMN> tag Version Timestamp in UTC time ISO 8601 standard format, representing last known fix Request PeerPoint reply bit
Heading
Speed, in km/h
Symbol
Examples
<PeerPoint>I am near 1234 Goodman St Overland Park Kans. 66223 at <N XX.XXXXX W XXX.XXXXX><GRMN . . . PACKEDINFO . . . >
<PeerPoint>Where are you?<GRMN . . . PACKEDINFO . . . >
Example messages:
Example 1
<GarminLoc>Meet me at <N>McDonald's<A>7926 W 151st St, Overland Park Kans. 66223 <T>913-897-5334<N XX.XXXXX W XXX.XXXXX><GRMN . . . PACKEDINFO . . . >
Example 2
<GarminLoc><N XX.XXXXX W XXX.XXXXX>

CONCLUSION

Techniques are described for automatically identifying/recognizing location information in received data and for providing navigational-related functions associated with the location information. In one or more implementations, automatically identifying location information may be performed using a locale context. Although these techniques are described in language specific to structural features and/or methodological operations, it is to be understood that the appended claims are not necessarily limited to the specific features or operations described. Rather, the specific features and operations are disclosed as example forms of implementing these techniques.

What is claimed is:

1. A location-aware device operable to receive content through a communications network, the device comprising:
    a processor;
    a position module operable to determine a current geographic location of the device;
    memory; and
    one or more modules stored in the memory and executable on the processor to:
        determine a locale context based on the current geographic location of the device, the locale context indicating an address format;
        based at least in part on the locale context, automatically identify location information in the received content received from one or more sources; and
        provide one or more navigational-related functions using the identified location information.

2. A location-aware device as recited in claim 1 configured as one or both of a cellular phone and/or a voice over internet protocol (VOIP) phone.

3. A location-aware device as recited in claim 1, wherein the content is received using a communication module associated with the processor, the content including one or more of:
    an e-mail message;
    an email message attachment;
    an instant message (IM); or
    a web page.

4. A location-aware device as recited in claim 1, wherein the content comprises unformatted text.

5. A location-aware device as recited in claim 1, wherein the location information comprises address information.

6. A location-aware device as recited in claim 1, wherein the one more modules are further executable on the processor to perform one or more of:
    transform at least a portion of the content comprising non-text data to text data;
    tokenize the location information into one or more location tokens associated with a location; or
    geo-code the location information into one or more coordinates designating the location.

7. A location-aware device as recited in claim 6, wherein one or more of to transform, automatically identify, tokenize or geo-code is performed at least in part by a server device communicatively linked to the location-aware device.

8. A location-aware device as recited in claim 1, wherein the navigational-related functions comprise one or more of:
    displaying at least a portion of the location information;
    saving a location associated with the location information as a point of interest;
    presenting the location in the context of map data; or
    providing navigational instructions for routing to the location.

9. A method for identifying information in content received by a location-aware device through a communications network, the method comprising:
    determining a locale context based on the current geographic location of the location-aware device, the locale context indicating an address format;
    automatically identifying address information in the received content at least in part by parsing text data associated with the received content in a manner suitable to the locale context;
    processing the address information to provide one or more coordinates for a location; and
    providing, on the location-aware device, a navigational-related function for the location based at least in part on the address information.

10. A method as recited in claim 9, wherein the text data includes unformatted text.

11. A method as recited in claim 9 wherein processing is performed at least in part by parsing the text data with one or more expressions in a manner suitable to the locale context.

12. A method as recited in claim 9, wherein all or part of automatically identifying is performed on a remote device communicatively linked to the location-aware device.

13. A method as recited in claim 9, wherein all or part of processing is performed on a remote device communicatively linked to the location-aware device.

14. A method as recited in claim 9, wherein processing comprises geo-coding the address information into one or more coordinates designating the location.

15. A method as recited in claim 9, wherein the navigational-related function comprises at least one of:
    displaying at least a portion of the address information;
    saving the location as a point of interest;
    presenting the location in the context of map data; or
    providing navigational instructions for routing to the location.

16. A portable location-aware communication device operable to receive content through a communications network, the device comprising:
    a processor;
    a position module operable to determine a current geographic location of the device;
    memory; and
    one or more modules stored in the memory and executable on the processor to:

determine a locale context based on the current geographic location of the device, the locale context indicating an address format;

based at least in part on the locale context, automatically identify location information in the content;

tokenize the identified location information into one or more location information tokens;

geo-code the location information tokens to provide coordinates for a location; and based at least in part on the coordinates, provide one or more navigational-related functions.

17. A portable location-aware communication device as recited in claim 16 configured as one or both of cellular phone and/or voice over internet protocol (VOIP) phone.

18. A portable location-aware communication device as recited in claim 16, wherein the location information comprises an address.

19. A portable location-aware communication device as recited in claim 16, wherein the content comprises unformatted text.

20. A portable location-aware communication device as recited in claim 16, wherein the content is received via one or both of a cellular network or an internet protocol (IP)-based network.

21. A portable location-aware communication device as recited in claim 16, wherein one or both of to geo-code or tokenize is performed in a manner suitable to the locale context.

22. A portable location-aware communication device as recited in claim 16, wherein the one or more navigational-related functions comprise at least one of:

saving the location as a point of interest;

presenting the location in the context of map data; or providing navigational instructions for routing to the location.

* * * * *